US011873634B2

(12) United States Patent
Kuru et al.

(10) Patent No.: US 11,873,634 B2
(45) Date of Patent: Jan. 16, 2024

(54) CLEAN TOILET AND ACCESSORIES

(71) Applicant: Kohler Co., Kohler, WI (US)

(72) Inventors: William Kuru, Plymouth, WI (US); Clayton Garrels, Kohler, WI (US); Peter W. Denzin, Glenbeulah, WI (US)

(73) Assignee: Kohler Co., Kohler, WI (US)

( * ) Notice: Subject to any disclaimer, the term of this patent is extended or adjusted under 35 U.S.C. 154(b) by 125 days.

(21) Appl. No.: 17/212,814

(22) Filed: Mar. 25, 2021

(65) Prior Publication Data

US 2021/0207354 A1 Jul. 8, 2021

Related U.S. Application Data

(63) Continuation of application No. 16/751,760, filed on Jan. 24, 2020, now Pat. No. 11,261,592, which is a (Continued)

(51) Int. Cl.
*E03D 9/03* (2006.01)
*E03D 9/05* (2006.01)
(Continued)

(52) U.S. Cl.
CPC .............. *E03D 9/05* (2013.01); *A47K 13/307* (2013.01); *A47K 17/00* (2013.01); *C11D 7/04* (2013.01); *C11D 11/0023* (2013.01); *C11D 11/0052* (2013.01); *E03D 1/36* (2013.01); *E03D 5/10* (2013.01); *E03D 9/005* (2013.01); *E03D 9/031* (2013.01); *E03D 9/032* (2013.01);
(Continued)

(58) Field of Classification Search
CPC .. A47K 17/00; E03D 1/36; E03D 5/10; E03D 9/005; E03D 9/032; C11D 11/0023
USPC .............................................................. 4/223
See application file for complete search history.

(56) References Cited

U.S. PATENT DOCUMENTS 120,979 A 11/1871 Jordan
149,195 A 3/1874 Burns et al.
(Continued)

FOREIGN PATENT DOCUMENTS

CN 201908349 U 7/2011
DE 7905670 10/1979
(Continued)

OTHER PUBLICATIONS

European Office Action for European Patent Application No. 18 168 664.3-1002 dated Mar. 26, 2021.
(Continued)

*Primary Examiner* — Huyen D Le
(74) *Attorney, Agent, or Firm* — Lempia Summerfield Katz LLC

(57) ABSTRACT

A chemical dispensing system for a toilet that includes a container configured to contain a chemical compound that mixes with water to form a cleaning compound; a bracket coupled to the container; a threaded protrusion that extends from the bracket and is configured to extend through a hole in an inside of the sidewall of the toilet; and a fastener having a threaded body and a head, which is larger radially than the threaded body such that the head is configured to contact an outside of the sidewall in a secured position in which the threaded body threads to the threaded protrusion.

19 Claims, 7 Drawing Sheets

Related U.S. Application Data continuation of application No. 15/994,713, filed on May 31, 2018, now Pat. No. 10,544,574, which is a continuation-in-part of application No. 15/900,933, filed on Feb. 21, 2018, now Pat. No. 10,450,733, which is a continuation of application No. PCT/US2016/048419, filed on Aug. 24, 2016.

(60) Provisional application No. 62/209,198, filed on Aug. 24, 2015.

(51) Int. Cl.

| | |
|---|---|
| ***A47K 17/00*** | (2006.01) |
| ***G08B 21/18*** | (2006.01) |
| ***C11D 7/04*** | (2006.01) |
| ***C11D 11/00*** | (2006.01) |
| ***A47K 13/30*** | (2006.01) |
| ***E03D 1/36*** | (2006.01) |
| ***E03D 5/10*** | (2006.01) |
| ***E03D 9/00*** | (2006.01) |
| ***G08B 5/36*** | (2006.01) |
| *E03D 9/02* | (2006.01) |

(52) U.S. Cl.

CPC ............. *E03D 9/033* (2013.01); *E03D 9/038* (2013.01); *G08B 5/36* (2013.01); *G08B 21/182* (2013.01); *E03D 2009/024* (2013.01); *E03D 2009/028* (2013.01)

(56) References Cited

U.S. PATENT DOCUMENTS 156,978 A 11/1874 Burns
507,656 A 10/1893 Kato et al.
1,091,265 A 3/1914 Wohlander
1,142,249 A 6/1915 Griffiths
1,643,286 A 9/1927 Burcham
1,688,098 A 10/1928 Turner
2,479,842 A 8/1949 Kirwan
2,558,469 A 6/1951 Travis
2,620,486 A 12/1952 Addlesburger
3,105,245 A 10/1963 Finkbiner
3,194,628 A 7/1965 Cannon
3,228,040 A 1/1966 Currie
3,781,923 A 1/1974 Maisch
3,890,657 A 6/1975 Gray
3,913,151 A 10/1975 Keimig
3,943,960 A 3/1976 Syrenne
4,056,228 A 11/1977 Rosenkrantz
4,153,956 A 5/1979 Fischer, Sr. et al.
4,166,298 A 9/1979 Pearson
4,318,192 A 3/1982 Williams
4,319,973 A 3/1982 Porta et al.
4,326,308 A 4/1982 Silver
4,350,575 A 9/1982 Porta et al.
4,434,938 A 3/1984 Rosenkrantz
4,455,203 A 6/1984 Stucki
4,467,480 A 8/1984 Keller
4,551,865 A 11/1985 Waters
4,617,687 A 10/1986 Wadsworth
4,780,913 A 11/1988 Williams
4,876,748 A 10/1989 Chun
4,982,454 A 1/1991 Saltel et al.
5,042,095 A 8/1991 Schoepe et al.
5,054,130 A 10/1991 Wilson
5,073,992 A 12/1991 Herring
5,123,124 A 6/1992 Brower
5,125,119 A 6/1992 Munoz
5,152,015 A 10/1992 Fourman
5,305,472 A 4/1994 Eger
5,325,544 A 7/1994 Busch
5,369,810 A 12/1994 Warren
5,454,122 A 10/1995 Bergeron
5,487,788 A 1/1996 Kamiya et al.
5,488,788 A 2/1996 Durbin
5,491,847 A 2/1996 Schaffer
5,493,737 A 2/1996 Chu
5,505,382 A 4/1996 Sealy
5,505,921 A 4/1996 Luckoff et al.
5,522,093 A 6/1996 Schaffer
5,570,477 A 11/1996 Rodriguez
5,575,019 A 11/1996 Kijewski
5,606,747 A 3/1997 Dupont
5,611,088 A 3/1997 Almon
5,635,039 A 6/1997 Cisar et al.
5,645,700 A 7/1997 White et al.
5,715,860 A * 2/1998 Horad ....................... E03D 1/32 4/324
5,778,459 A 7/1998 Guerin
5,850,638 A 12/1998 Her
5,881,396 A 3/1999 Rivera
5,987,659 A 11/1999 Cannizzaro
6,151,722 A 11/2000 Lubrano
6,279,174 B1 8/2001 Candusso
6,282,732 B1 9/2001 Krvavica
6,319,390 B1 11/2001 Kono et al.
6,321,392 B1 11/2001 Sim
6,339,850 B1 1/2002 Gore
6,387,238 B1 5/2002 Merk et al.
6,432,376 B1 8/2002 Choudhary et al.
6,491,797 B1 12/2002 Locke et al.
6,555,055 B1 4/2003 Cisar et al.
6,620,210 B2 9/2003 Murphy et al.
6,641,739 B2 11/2003 Dresty et al.
6,651,260 B1 11/2003 Dodson
6,662,379 B2 12/2003 Nguyen et al.
6,675,405 B1 1/2004 Harm
6,712,949 B2 3/2004 Gopal
6,761,815 B2 7/2004 Nakajima et al.
6,767,447 B2 7/2004 Uno et al.
6,772,450 B1 8/2004 Saylor et al.
6,773,575 B2 8/2004 Nakajima et al.
6,785,915 B1 9/2004 Daugherty
6,823,535 B2 11/2004 Tomita et al.
6,928,666 B1 8/2005 Schaffer
6,973,679 B1 12/2005 Schad
7,007,312 B1 3/2006 Sim
7,155,751 B2 * 1/2007 Antunez ................. E03D 5/092 4/391
7,195,747 B2 3/2007 Vanden Bussche et al.
7,214,537 B2 5/2007 Stevens et al.
7,442,283 B1 10/2008 Gandhi et al.
7,549,181 B1 6/2009 Davis et al.
7,603,726 B2 10/2009 Sawalski
7,604,719 B2 10/2009 Vanden Bussche et al.
7,661,153 B2 2/2010 Nakamura et al.
7,754,064 B2 7/2010 Buschmann et al.
7,959,773 B2 6/2011 Hou et al.
8,015,628 B2 9/2011 Campau et al.
8,032,956 B2 10/2011 Prokopenko et al.
8,079,095 B2 12/2011 Jensen
8,095,997 B2 1/2012 Harris
8,226,899 B2 7/2012 Woodbridge
8,453,272 B2 6/2013 Sim
8,591,719 B2 11/2013 Faita
8,631,519 B1 * 1/2014 Belliard .................. E03D 9/037 4/225.1
8,806,669 B2 8/2014 Halloran et al.
8,925,119 B2 * 1/2015 Burt ........................ E03D 9/037 4/225.1
9,714,507 B1 7/2017 Snell
10,450,733 B2 10/2019 Luettgen et al.
10,544,574 B2 1/2020 Kuru et al.
2002/0119136 A1 8/2002 Johansen
2002/0194670 A1 12/2002 Hashemi
2004/0181865 A1 9/2004 Egersei
2004/0194196 A1 10/2004 Muderlak
2004/0216221 A1 11/2004 Chen
2005/0072665 A1 4/2005 Gomez
2006/0065542 A1 3/2006 Nemeth et al.
2006/0150311 A1 7/2006 Chang
2007/0119699 A1 5/2007 Chambers et al.

(56) References Cited

U.S. PATENT DOCUMENTS

| | | | |
|---|---|---|---|
| 2007/0151013 | A1 | 7/2007 | Pace |
| 2007/0197388 | A1 | 8/2007 | Vunk et al. |
| 2007/0240252 | A1 | 10/2007 | Leonard et al. |
| 2008/0060947 | A1 | 3/2008 | Kitsuka et al. |
| 2008/0245684 | A1 | 10/2008 | Yeatman |
| 2008/0251373 | A1 | 10/2008 | Oke |
| 2008/0301866 | A1 | 12/2008 | Allard et al. |
| 2009/0074611 | A1 | 3/2009 | Monzyk et al. |
| 2009/0165823 | A1 | 7/2009 | Brown et al. |
| 2009/0212132 | A1 | 8/2009 | Simmonds et al. |
| 2009/0272654 | A1 | 11/2009 | Brown et al. |
| 2009/0311395 | A1 | 12/2009 | Cervin et al. |
| 2010/0006122 | A1 | 1/2010 | Brown et al. |
| 2010/0010285 | A1 | 1/2010 | Ebron et al. |
| 2011/0277227 | A1 | 11/2011 | Nonnenmacher |
| 2011/0318610 | A1 | 12/2011 | Rabaey et al. |
| 2012/0048744 | A1 | 3/2012 | Kim et al. |
| 2012/0058709 | A1 | 3/2012 | Fukushima et al. |
| 2012/0311775 | A1 | 12/2012 | Li |
| 2013/0175373 | A1 | 7/2013 | Morgan et al. |
| 2013/0305445 | A1 | 11/2013 | Stammel et al. |
| 2015/0013057 | A1 | 1/2015 | Bucher et al. |
| 2015/0013058 | A1 | 1/2015 | Bucher et al. |
| 2015/0345123 | A1 | 12/2015 | Grover et al. |
| 2015/0354189 | A1 | 12/2015 | Kim |
| 2016/0280422 | A1 | 9/2016 | Dorrance |
| 2017/0058500 | A1 | 3/2017 | Garrels et al. |
| 2019/0360188 | A1 | 11/2019 | Moshe |
| 2021/0361125 | A1 | 11/2021 | Racioppi et al. |

FOREIGN PATENT DOCUMENTS

| | | | |
|---|---|---|---|
| DE | 800 00 249 | U1 | 6/1980 |
| DE | 19752069 | | 6/1999 |
| EP | 0526077 | | 2/1993 |
| EP | 2336434 | | 6/2011 |
| EP | 3009573 | | 4/2016 |
| FR | 2699572 | A1 | 6/1994 |
| GB | 264364 | | 1/1927 |
| GB | 507 908 | | 6/1939 |
| WO | 0033716 | A1 | 6/2000 |
| WO | WO-03/079955 | A1 | 10/2003 |
| WO | WO03/085214 | | 10/2003 |
| WO | WO-2005/038091 | A2 | 4/2005 |
| WO | WO2005/045145 | | 5/2005 |
| WO | WO2007/149996 | | 12/2007 |
| WO | WO-2008/034633 | A2 | 3/2008 |
| WO | WO-2009/068496 | A1 | 6/2009 |
| WO | WO-2010/040164 | A1 | 4/2010 |
| WO | 2010140471 | A1 | 12/2010 |
| WO | WO-2010/139584 | A1 | 12/2010 |
| WO | WO-2011/016206 | A1 | 2/2011 |
| WO | WO-2011/114105 | A1 | 9/2011 |
| WO | WO-2012/058709 | A1 | 5/2012 |
| WO | WO-2013/045895 | A1 | 4/2013 |

OTHER PUBLICATIONS

Chinese Office Action for Chinese Application No. 201810593664.1 dated May 15, 2020.

Chinese Office Action for Chinese Application No. 201810593842.0 dated Jun. 2, 2020.

European Office Action for European Application No. 18 168 653.6-1002 dated May 20, 2020.

European Office Action for European Application No. 18 168 655.1-1002 dated Mar. 9, 2020.

European Office Action from European Patent Application No. 18168664.3, dated Jul. 8, 2022, 4 pages.

European Office Action from European Patent Application No. 18168653.6, dated May 24, 2022, 5 pages.

International Search Report and Written Opinion Issued in Application No. PCT/US2016/048419.

European Search Report re Application No. 18168664; 9 pages.

European Search Report re Application No. 18168653; 9 pages.

European Search Report re Application No. 18168655 dated Aug. 29, 2018; 9 pages.

European Search Report re Application No. 18168662.7 dated Sep. 5, 2018; 9 pages.

Extended European Search Report from European Patent Application No. 23185389.6, dated Oct. 25, 2023, 8 pages.

* cited by examiner

CLEAN TOILET AND ACCESSORIES

CROSS-REFERENCE TO RELATED PATENT APPLICATIONS

The present application is a Continuation under 35 U.S.C § 120 and 37 C.F.R. § 1.53(b) of U.S. patent application Ser. No. 16/751,760 (filed Jan. 24, 2020), which is a Continuation of U.S. patent application Ser. No. 15/994,713 (filed May 31, 2018, now U.S. Pat. No. 10,544,574), which is a Continuation-in-Part of U.S. patent application Ser. No. 15/900,933 (filed Feb. 21, 2018, now U.S. Pat. No. 10,450,733), which is a Continuation of International Application No. PCT/US2016/048419 (filed Aug. 24, 2016), which claims the priority to and the benefit of U.S. Provisional Patent Application No. 62/209,198 (filed Aug. 24, 2015). The present application incorporates by reference all of the aforementioned applications in their entireties.

BACKGROUND

This application relates generally to the field of cleaning systems for use with toilets. More specifically, this application relates to cleaning systems configured to dispense cleaning compounds for use in toilets to improve the cleanliness in and around the toilets.

Overtime from use, scale (e.g., urine scale), minerals, bacteria, and other undesirable deposits (e.g., biofilm) build-up on the surfaces of toilets and, in particular, on the inner surfaces of the bowl and trapway. Moreover, these deposits may become lodged in small imperfections in the inner surfaces of the toilet, which may be a vitreous material. These built-up deposits can lead to undesirable odors and stains, as well as harbor germs and bacteria. It would be advantageous to provide a toilet having internal cleaning systems that provide improved cleanliness to address the aforementioned problems, such as prohibiting or reducing scale and/or providing odor abatement.

SUMMARY

At least one embodiment of this application relates to a toilet that includes a bowl, a tank, a container, a connector, and a flush valve. The tank has a sidewall and a bottom defining a reservoir. The container is located inside the reservoir and is configured to contain a chemical compound that mixes with water from a fill valve to form a cleaning compound. The connector is configured to couple the container to the sidewall; and the connector includes a bracket coupled to the container, a threaded protrusion that extends from the bracket into a hole in the sidewall of the tank, and a threaded fastener having a threaded body and a head, which is larger radially than the threaded body such that the head contacts an outside of the sidewall in a secured position in which the threaded body threads to the threaded protrusion. The flush valve is fluidly connected to the container to introduce the cleaning compound into the bowl through an outlet in the bottom of the tank during a cleaning cycle.

At least one embodiment relates to a toilet that includes a tank having a sidewall, a container disposed inside the tank and coupled to the sidewall, and a container lid that detachably couples to the container in a secured position. The container includes a body having a wall with an open top to define a reservoir in the body, the reservoir being configured to contain a chemical compound that mixes with water from a fill valve to form a cleaning compound. The container lid includes a base that is disposed on an upper end of the wall, the base having a bore; a slider having an upper portion, which is fitted in the bore, and a lower portion, which is fitted in the open top in the body and includes an outwardly extending lip; a resilient member disposed around at least part of the lower portion of the slider between the lip and the base; and a cam member comprising a lever and a leg extending from the lever, wherein the leg is rotatably coupled to the slider about a pivot axis and includes a cam surface offset from the pivot axis, wherein rotation of the cam member relative to the base and the slider from a non-locking position to a locking position moves the slider relative to the base through the cam surface contacting the base such that the lip biases the resilient member outwardly from a clearance fit into an interference fit with the wall of the body to secure the container lid to the container in the secured position.

At least one embodiment relates to a toilet that includes a tank having a sidewall with an open top to define a reservoir; a shroud disposed in and closing off the open top in an installed position, the shroud having a body with a through hole; a tank lid configured to conceal the shroud with the tank in a covered position; a container located inside the reservoir and below a top of the shroud, wherein the container is configured to contain a chemical compound that mixes with water to form a cleaning compound; and a container lid configured to detachably couple to the container through the through hole to form a fluid tight seal between the container lid and the container in a locked position, wherein the container lid is accessible with the tank lid removed from the tank.

DETAILED DESCRIPTION

Referring generally to the Figures, disclosed in this application are toilets having integrated chemical dispensing systems or assemblies, which are configured to introduce (e.g., deliver, dispense, etc.) a chemistry (e.g., a cleaning compound) into a bowl of the toilet during a cleaning cycle. As discussed below, the cleaning compound includes a chemical compound, which can be mixed with water to dilute the concentration of chemical compound. The water can be supplied by a fill valve of the toilet; and the cleaning compound can be introduced into the bowl through a flush valve of the toilet. By way of example, the systems and methods, as disclosed herein, may be configured to influence (e.g., reduce) scale, slippery, and/or sanitation through the cleaning compound to thereby have improved cleanliness. As used herein, the term "scale" generally refers to mineral deposits (e.g., calcium carbonate, magnesium carbonate, etc.), that collect or build-up on the surfaces of the components of systems, such as toilets. As used herein, the term "slippery" generally refers to coating(s) that may be applied to the surfaces of the components of the systems to influence the coefficient of friction of the surfaces. For example, a non-stick coating, such as a diamond-fusion coating, may be applied to surfaces of the components to reduce the coefficient of friction of the surfaces to which the coating is applied. As used herein, the term "sanitation" generally refers to the application (e.g., introduction, etc.) of anti-microbial chemicals. Thus, the toilets disclosed herein can introduce a cleaning compound to thereby reduce, scale, slippery, and/or sanitation.

The toilets and methods of this application may be configured to utilize one or more than one compound/chemistry to improve the cleanliness of the toilet. In this application, the terms "chemistry," "compound," and "cleaning compound" are used interchangeably to connote the use of a chemical, chemical compound, chemical element, or any combination thereof that is beyond that of mere water. Thus, while the systems described in this application may use water (e.g., to dilute a cleaning compound, for flushing, etc.) and the cleaning compounds may include water, the chemistry/compounds/cleaning compounds include at least one additional chemical (e.g., elements, compounds, etc.) other than water.

Figure 1:
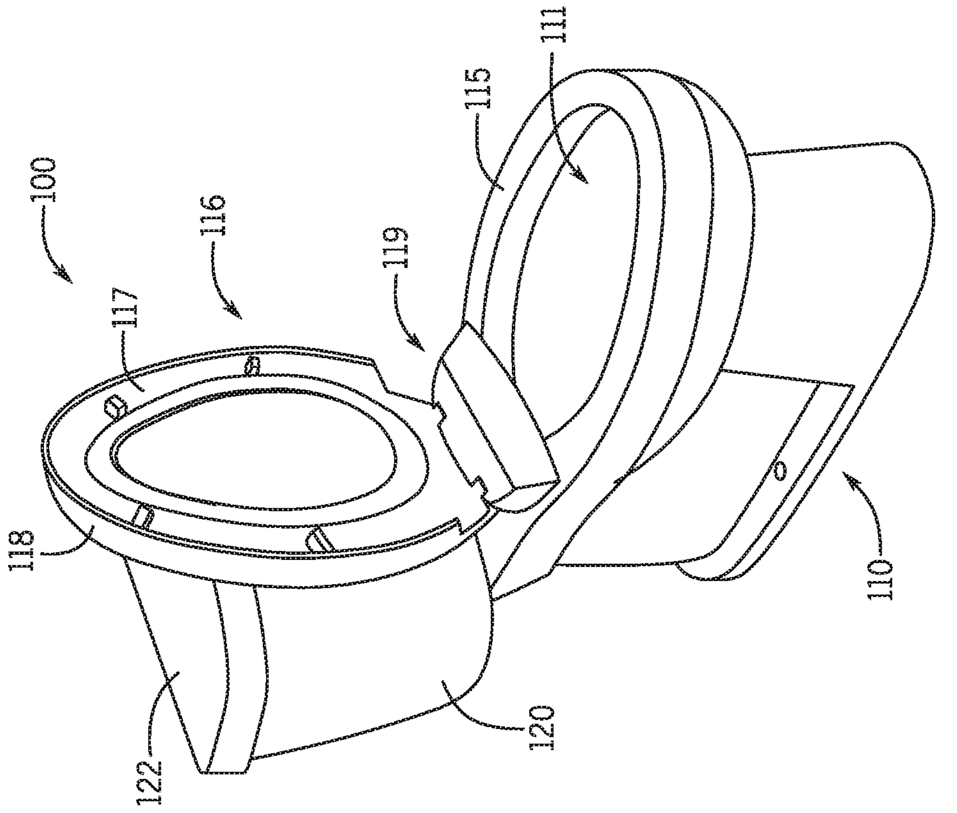
FIG. 1 is a perspective view of an exemplary embodiment of a toilet.

FIG. 1 illustrates an exemplary embodiment of a toilet 100 including a base 110 (e.g., pedestal, bowl, etc.), a tank 120 (e.g., cistern, etc.) supported by the base 110, and a seat assembly 116. The base 110 is configured to be secured to another object, such as a drain pipe, floor, combination thereof, or any other suitable object. The base 110 includes a bowl 111 defined by a rim 115 of the base 110 and an internal passageway fluidly connecting the bowl 111 to the drain pipe (not shown). The illustrated seat assembly 116 that includes a seat 117 and a seat cover 118, both of which are pivotally (e.g., rotatably) coupled to the base 110 through a hinge assembly 119 having one or more pivots (e.g., hinges). The hinge assembly 119 is shown mounted to the rim 115 and rotatably supporting the seat 117 and the seat cover 118.

The tank 120 shown in FIG. 1 is separate from the base 110 and supported by an upper surface of a ledge of the base 110 that is rearward of the rim 115. Thus, the illustrated toilet 100 is commonly referred to as a two-piece toilet. Alternatively, the tank 120 may be integrally formed with the base 110 (e.g., the ledge), which is commonly referred to as a one-piece toilet. It is noted that the elements of the tank assembly described herein may be used with other types of toilets and other types of tanks for toilets.

FIGS. 2-6 illustrate an exemplary embodiment of a tank assembly 102 for use with a toilet, such as the one-piece toilet 100 shown in FIG. 1. The tank assembly 102 includes the tank 120, a lid 122 (e.g., tank lid), a fill valve 130, a flush valve 140, a shroud 150, and a chemical dispensing system 160. The fill valve 130 is located inside the reservoir and is configured to receive water through an inlet 131 (through the inlet opening **120*d*) to selectively fill the reservoir to a high water level HWL. The fill valve 130** can have any construction.

Figure 4:
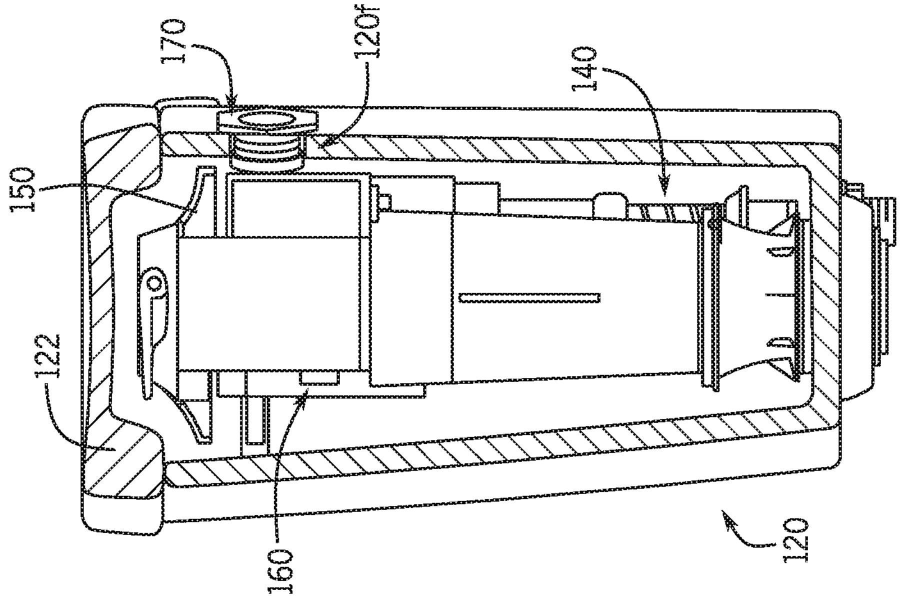
FIG. 4 is a partial cutaway side view of the toilet tank shown in FIG. 2.
Figure 3:
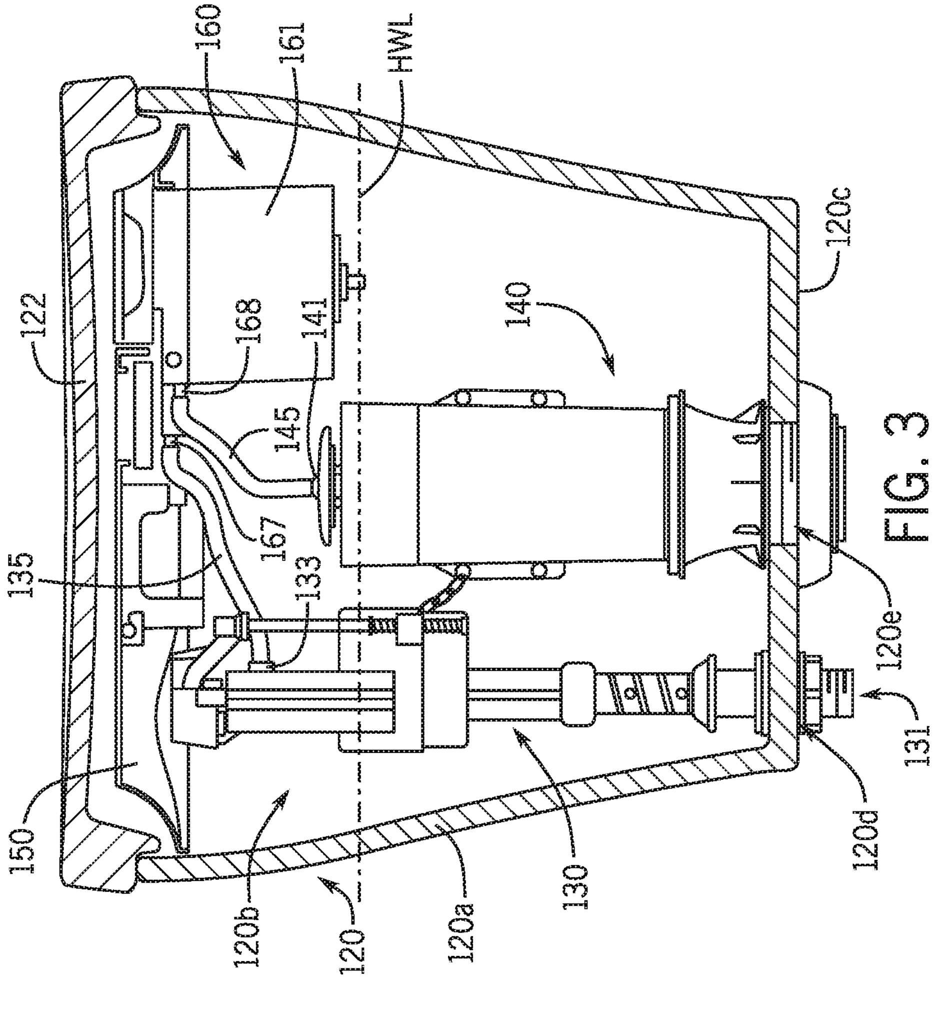
FIG. 3 is a partial cutaway front view of the toilet tank shown in FIG. 2.

The illustrated tank 120 includes one or more sidewalls **120*a* and a bottom 120*c* that define an internal reservoir 120*b* (e.g., cavity) that is accessible through an open top in the tank 120. The bottom 120*c* has an inlet opening 120*d* and an outlet opening 120*e*. A hole 120*f* is located in one sidewall 120*a* for securing the chemical dispensing system 160 to the tank 120. As shown in FIG. 4, the hole 120*f* is located in a rear facing sidewall 120*a* and is positioned or located above the high water level HWL and below the shroud 150**.

The illustrated lid 122 is configured to conceal the shroud 150 in a covered position (i.e., positioned or resting on top of the tank 120 covering the open top and reservoir **120*b* of the tank). The lid 122 can be removed from the tank 120 to access the shroud 150, such as to remove the shroud 150, as well as access the chemical dispensing system 160** or part(s) thereof.

Figure 2:
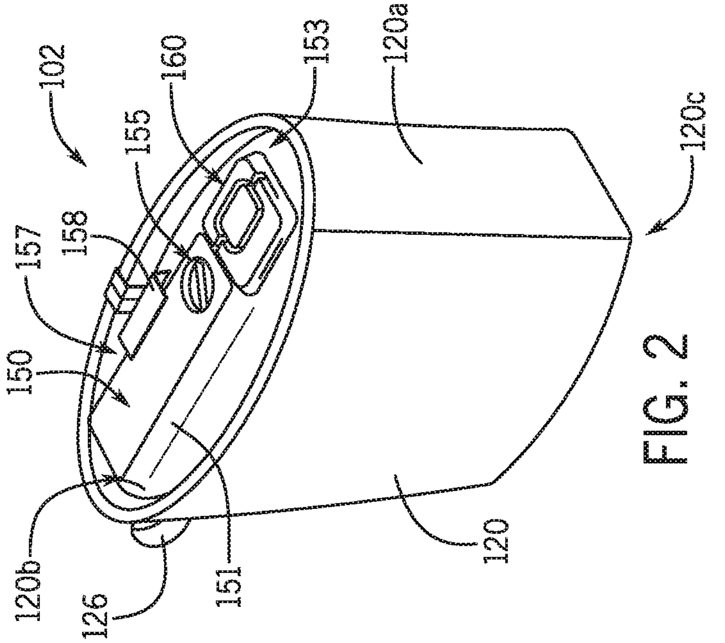
FIG. 2 is a perspective view of a toilet tank for use with the toilet shown in FIG. 1.
Figure 5:
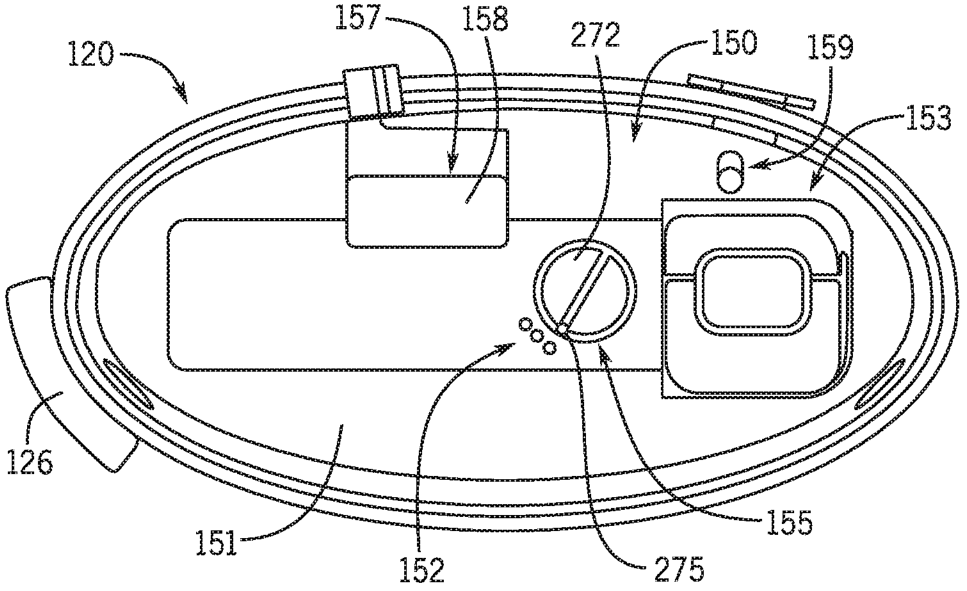
FIG. 5 is a top view of the toilet tank shown in FIG. 2 with the toilet lid removed.
Figure 6:
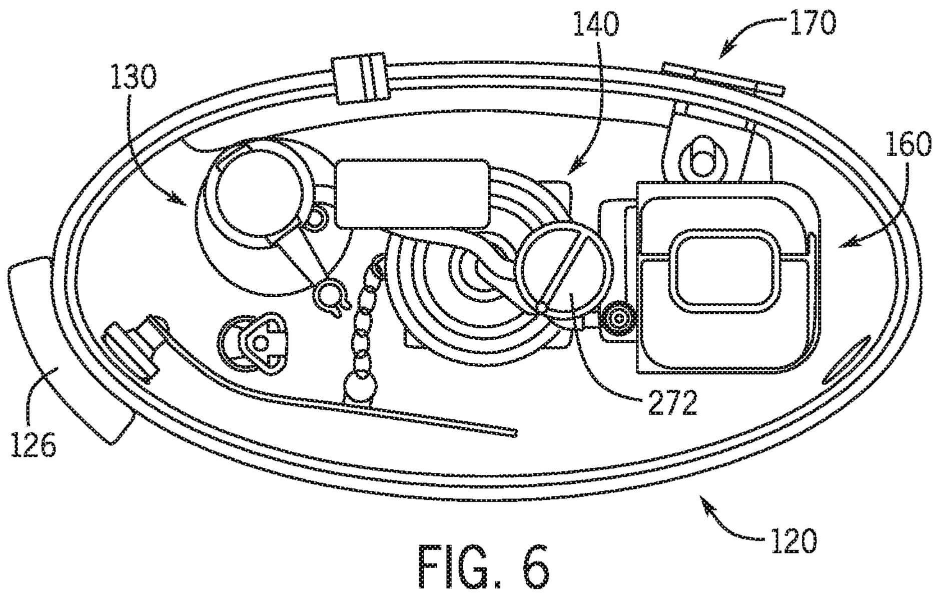
FIG. 6 is a top view of the toilet tank shown in FIG. 2 with the toilet lid and the shroud removed.
Figure 8:
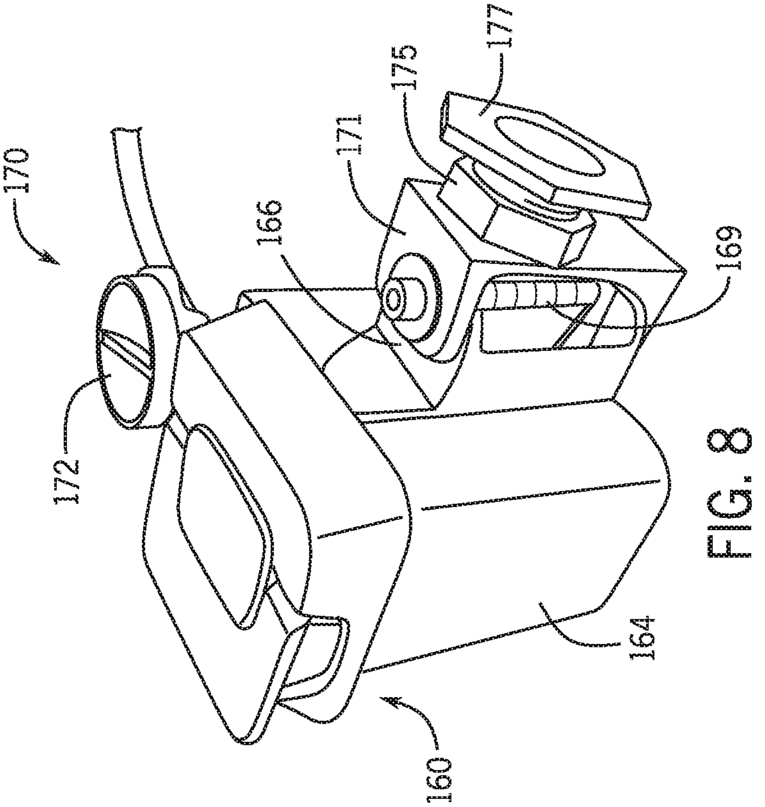
FIG. 8 is a rear perspective view of the container assembly shown in FIG. 7.

FIGS. 2, 5, and 6 also show a flush handle 126 that is configured to initiate a flush cycle of the toilet. For example, the flush handle 126 can be operatively coupled to the flush valve 140 to open the valve in response to a user of the toilet rotating the flush handle 126 relative to the tank 120. The flush handle 126 and/or other actuators (e.g., buttons, handles, devices, etc.) can operate the chemical dispensing system 160.

The illustrated shroud 150 is disposed in and closes off the open top of the tank 120 in an installed position (FIG. 2) to conceal the fill valve 130, the flush valve 140, and at least part of the chemical dispensing system 160 (e.g., a container thereof). The shroud 150 includes a body 151 having an outer profile (e.g., when viewed from above) that complements the shape (e.g., profile) of an inside of the tank 120. The outer profile of the body 151 can contact the inside of the tank 120. The body 151 of the shroud 150 includes one or more holes. As shown best in FIGS. 2 and 5, the body 151 includes a through hole 153 (e.g., a first through hole, aperture, opening, etc.) that receives at least one part of the chemical dispensing system 160 (e.g., a container lid thereof). The through hole 153 is configured (e.g., shaped, sized, etc.) based on the configuration of at least one part of the chemical dispensing system 160. Also shown, a second through hole 155, which is separate and offset from the through hole 153, extends through the body 151 to receive another part of the chemical dispensing system 160 (e.g., a multi-position control 272 thereof). Additional holes can, optionally, be disposed in the shroud 150. By way of example, a third hole 157 can be disposed in the shroud 150 to receive a reset control 158 and/or a fourth hole 159 can be disposed in the shroud 150 to receive a fastener or indicator (e.g., an illuminated indicator).

FIGS. 7-16 illustrate an exemplary embodiment of a chemical dispensing system 160 that includes a container 161 that is located in (e.g., inside, within, etc.) the reservoir 120*b* and is configured to contain (e.g., hold, house, etc.) a chemical compound. As noted above, the chemical compound can mix with water to form a cleaning compound. Alternatively, the chemical compound can be used as the cleaning compound with dilution. As shown best in FIG. 3, an inlet line 135 fluidly connects an outlet 133 of the fill valve 130 and an inlet 167 of the container 161, and an outlet line 145 fluidly connects an outlet 168 of the container 161 with an inlet 141 of the flush valve 140.

The illustrated container 161 includes a body 162 having a bottom 163 (FIG. 11) and a plurality of walls 164 (e.g., sidewalls) interconnected with the bottom 163 and with an open top to define an internal reservoir 165 in the body 162. Thus, the reservoir 165 is accessible through an opening in a top of the container 161. As shown best in FIGS. 8-11, the container 161 includes a flange 166 extending outwardly from an exterior of one wall 164, and the illustrated flange 166 includes two arms that are spaced apart to form a clevis (e.g., clevis shape). The flange 166 is configured to secure the container 161, as discussed below.

As shown best in FIGS. 4 and 6, a connector 170 is configured to secure or couple the chemical dispensing system 160 to a sidewall 120*a* of the tank 120. As shown best in FIGS. 8-10, the connector 170 includes a bracket 171, which is located inside the reservoir 120*b* of the tank 120 and is directly coupled to the flange 166 of the container 161 through a fastener 169. The illustrated bracket 171 has a body 172, which is shown generally planar, and two spaced apart arms 173 extending from the body 172 to form a clevis, and the fastener 169 extends through one of the two spaced apart arms (e.g., the top arm) and threads to the other of the two spaced apart arms (e.g., the bottom arm). Accordingly, the container 161 and the bracket 171 can pivot relative to one another about the fastener 169. The bracket 171 includes a threaded protrusion 175 that extends from the body 172 of the bracket 171 in an opposite direction as the arms 173 to engage a hole 120*f* in a sidewall 120*a* of the tank 120 when coupling the container 161 to the tank 120. Thus, the arms 173 and the threaded protrusion 175 are on opposite sides of the body 172. The illustrated threaded protrusion 175 includes internal threads and has a hexagonal outer shape, which can dictate orientation and/or prevent relative rotation between the threaded protrusion 175 and the hole 120*f* in the sidewall 120*a* of the tank 120 if the hole 120*f* has a complementary shape. The illustrated hole 120*f* is located above the high water level HWL in the reservoir 120*b* and is located below the shroud 150.

The illustrated connector 170 also includes a threaded fastener 177 having a threaded body 178 and a head 179. The threaded body 178 has external threads that thread to the internal threads of the threaded protrusion 175. The head 179 is larger radially (e.g., diametrically) than the threaded body 178, such that the head 179 contacts an outside surface of the sidewall 120*a* (being secured to) in a secured position, in which the threaded body 178 threads to the threaded protrusion 175. The illustrated head 179 has a hexagonal outer shape to facilitate rotation, such as using a wrench, other tool, or by hand. Thus, to couple the container 161 to the tank 120, the threaded protrusion 175 is inserted into the hole 120*f* in the sidewall 120*a* (with the bracket 171 coupled to the container 161), so that the body 172 of the bracket 171 abuts or is adjacent to the inside surface of the sidewall 120*a*, then the threaded fastener 177 is threaded to the threaded protrusion 175 from outside the tank 120. The threaded fastener 177 can be turned until the sidewall 120*a* is securely clamped between the head 179 and the body 172.

Figure 7:
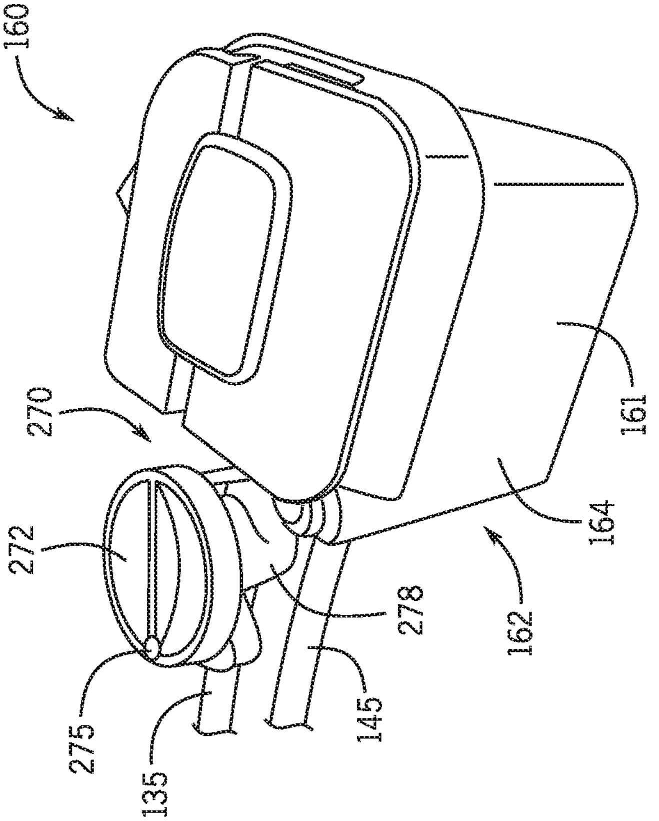
FIG. 7 is a front perspective view of an exemplary embodiment of a container assembly for use with the toilet shown in FIG. 1.
Figure 10:
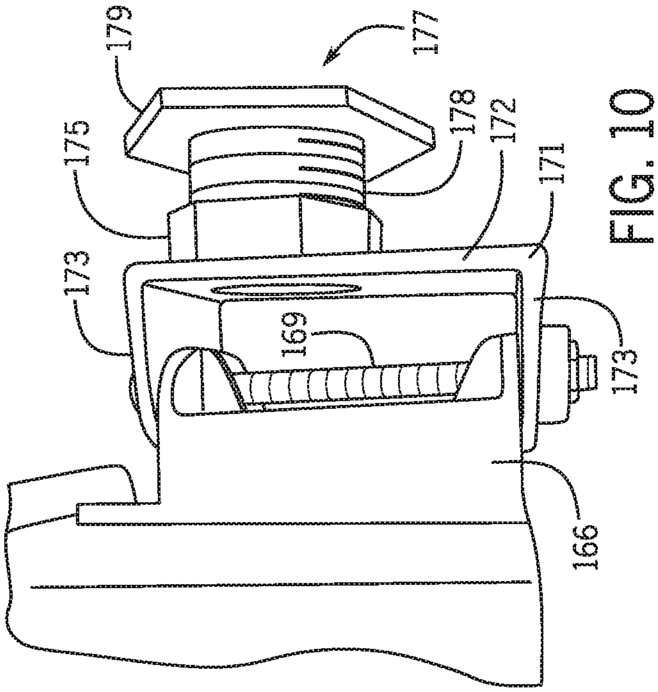
FIG. 10 is a perspective view of the connector shown in FIG. 9 in an assembled position.
Figure 9:
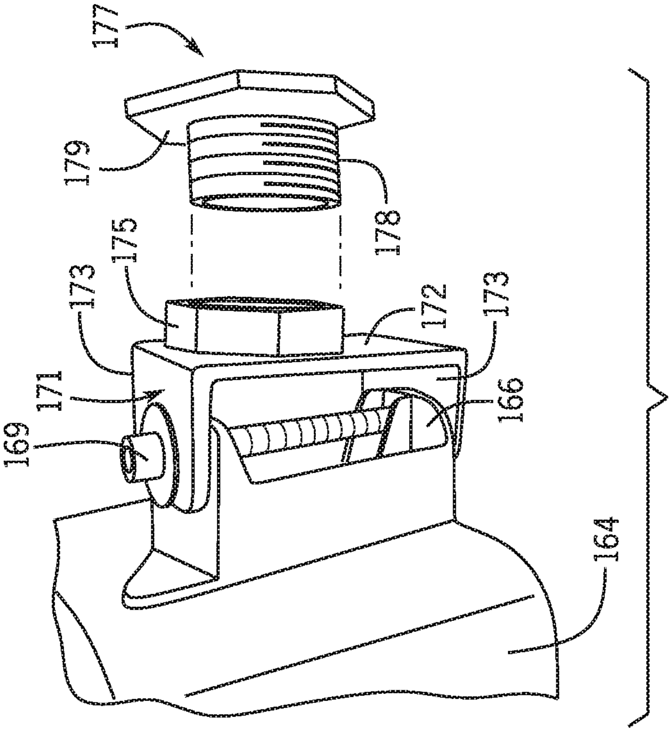
FIG. 9 is a perspective view of the connector of the container assembly shown in FIG. 7 in a disassembled position.
Figure 12:
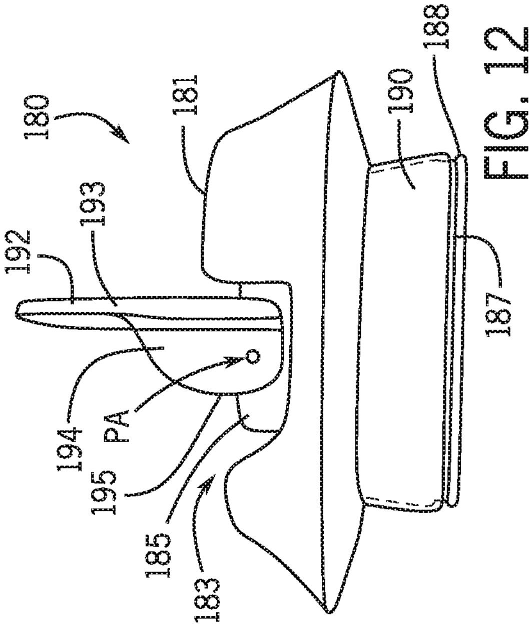
FIG. 12 is a side view of the lid of the container assembly shown in FIG. 7 in a non-locking position.
Figure 11:
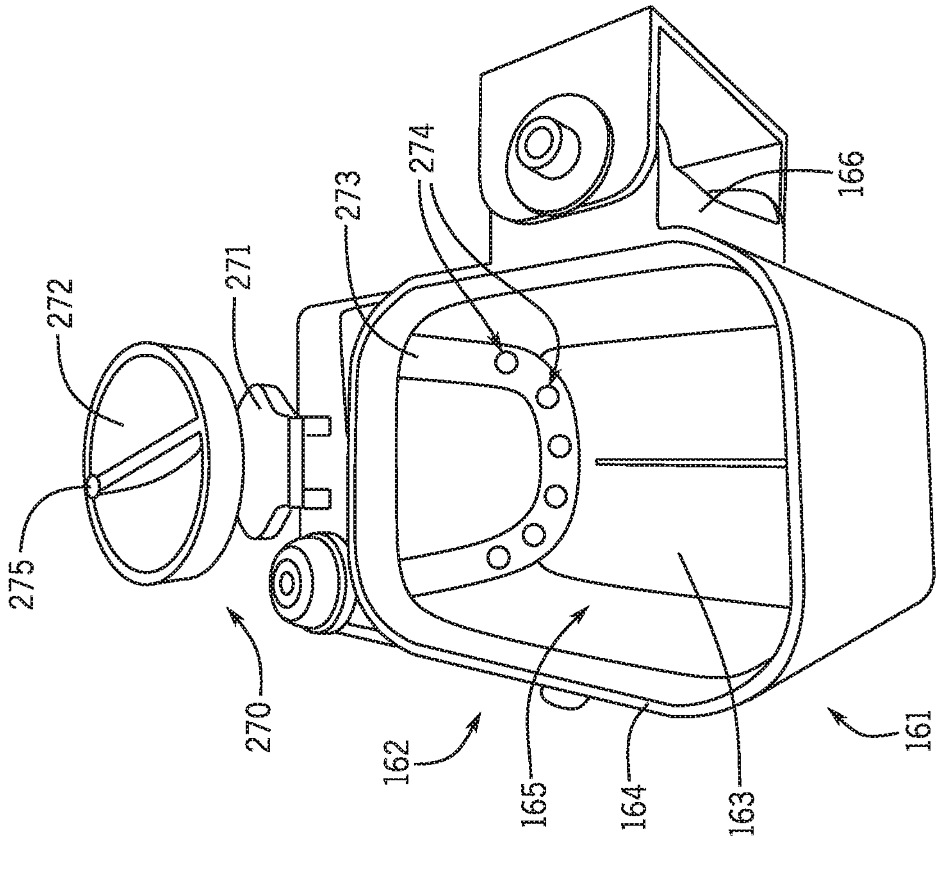
FIG. 11 is a top perspective view of the container shown in FIG. 7 with the lid removed.
Figure 14:
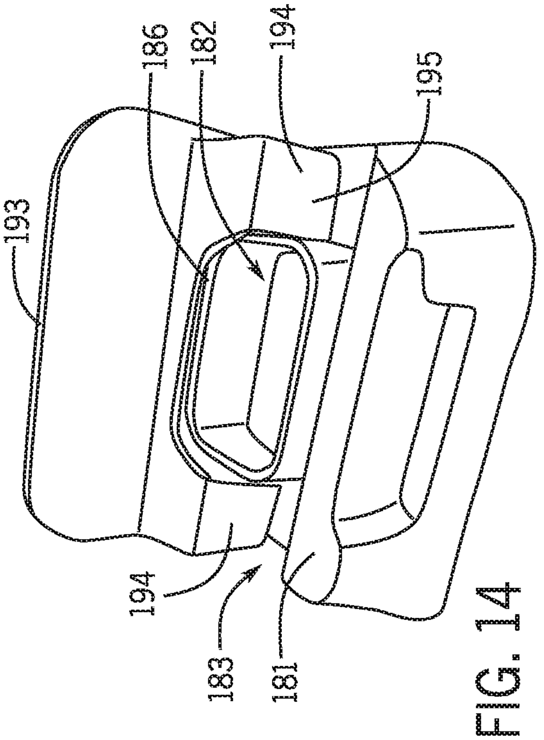
FIG. 14 is a front perspective view of the lid shown in FIG. 12 in the non-locking position.

As shown best in FIGS. 7 and 11, the chemical dispensing system 160 includes a valve assembly 270 that is configured to control a flow rate of water into the container 161 from the fill valve 130. The illustrated valve assembly 270 includes a housing 271 that is operatively coupled to the container 161 and includes the inlet 167 fluidly connected to the inlet line 135. Located in the housing 271 is a valve that is operable in two or more positions corresponding to two or more settings of the valve, in which a flow rate of water into the container 161 form the inlet 167 is controlled. Thus, the flow rate of water is different in each position (e.g., setting) of the valve. Further, the valve can be a ball valve or any other suitable type of valve.

Figure 17:
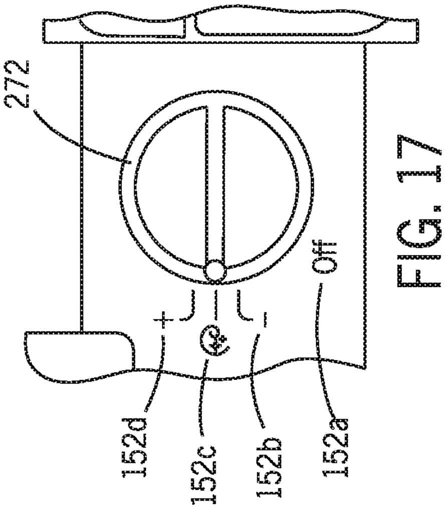
FIG. 17 is a plan view of an exemplary embodiment of a multi-position control for controlling operation of a chemical dispensing system.

A multi-position control 272 extends above the housing 271 and is operably coupled to the valve, so that the control 272 changes (e.g., switches) operation of the valve between the two or more settings. The illustrated control 272 is configured as a rotary knob that can be rotated into each position. On the knob is an indicator 275 that aligns with indicators 152 in the shroud 150 (FIG. 5) to inform a user as to the setting of the valve. The illustrated embodiment in FIG. 5 includes three indicators 152, which can include an off position and two different cleaning settings (e.g., a first concentration of chemistry/chemical compound, a second concentration of chemistry/chemical compound) or three different cleaning settings. FIG. 17 illustrates an exemplary embodiment of a four position/setting chemical dispensing system. The multi-position control 272 can be toggled (e.g., rotated) between a first position 152*a* shown as an "off" setting, in which the chemical dispensing system dispenses only water without a chemistry, a second position 152*b* shown as a "–" setting, in which the chemical dispensing system dispenses a first concentration (e.g., a reduced concentration below that of a nominal concentration), a third setting 152*c*, in which the chemical dispensing system dispenses a second concentration (e.g., a nominal concentration), and a fourth setting 152*d* shown as a "+" setting, in which the chemical dispensing system dispenses a third concentration (e.g., an increased concentration above that of a nominal concentration). The multi-position control 272 is accessible with the lid 122 removed from the tank 120 and with the shroud (e.g., the shroud 150) in place. As shown best in FIGS. 2 and 5, the control 272 nests within and is accessible through the through hole 155 in the shroud 150. The through hole 155 is shown separate from the through hole 153 that receives the container lid and/or the through hole 157 that receives the reset button 158.

As shown in FIG. 11, the outlet from the valve assembly 270 is fluidly connected to an inlet of a diffusing tube 273, which is illustrated as a U-shaped tube having an outlet that is located at the end opposite the inlet and is fluidly connected to the outlet 168 and the outlet line 145. The diffusing tube 273 has a plurality of spaced apart openings 274 located between the inlet and the outlet of the diffusing tube 273, and the part of the diffusing tube 273 having the openings 274 is disposed under a fluid level of the container 161 so that water received through the inlet 167 can flow out the openings 274 to mix with the chemical compound in the reservoir 165. The cleaning compound can flow back into the openings 274, such as during a flush cycle and/or a cleaning cycle, and through the outlet 168 to the flush valve 140.

The chemical dispensing system 160 includes a container lid 180 that detachably (e.g., removably) couples to the container 161 in a secured position (FIGS. 7 and 8) and allows access to the reservoir 165 of the container 161 in a removed position (FIG. 11). FIGS. 12-16 illustrate an exemplary embodiment of a container lid 180 that includes a base 181, a slider 185 (e.g., sliding member), a resilient member 190, and a cam lever 192.

The base 181 is disposed on an upper end of the wall(s) 164 of the container 161 in a coupled position, as shown in FIGS. 3, 4, 7, and 8. The base 181 has a shape that complements the through hole 153 in the shroud 150 and is configured to cover the open top in the container 161. The illustrated base 181 has a flat bottom, which rests on the container 161 in the coupled position, a through bore 182 extending through the base 181, and a recess 183 (e.g., cutaway, pocket, etc.) in the top.

The illustrated slider 185 includes an upper portion 186, which is fitted in the through bore 182 of the base 181, and a lower portion 187, which extends down from the upper portion 186 and is configured to fit in the opening (e.g., the open top) in the body 162 of the container 161. As shown, an outer profile of the upper portion 186 of the slider 185 complements a profile of the through bore 182 in the base 181. The lower portion 187 has a lip 188 (FIG. 12) that extends outwardly from an outer surface of the lower portion. The lip 188 can extend around the entire periphery/profile of the lower portion 187 or a portion thereof.

The resilient member 190 is disposed around at least part of the lower portion 187 of the slider 185 between the lip 188 and the base 181. The term "resilient" denotes that the member is compliant and/or is able to deform elastically under loading and can recover after the load is removed. The illustrated resilient member 190 is ring shaped, has a generally rectangular cross-section, and extends around the lower portion 187.

Figure 13:
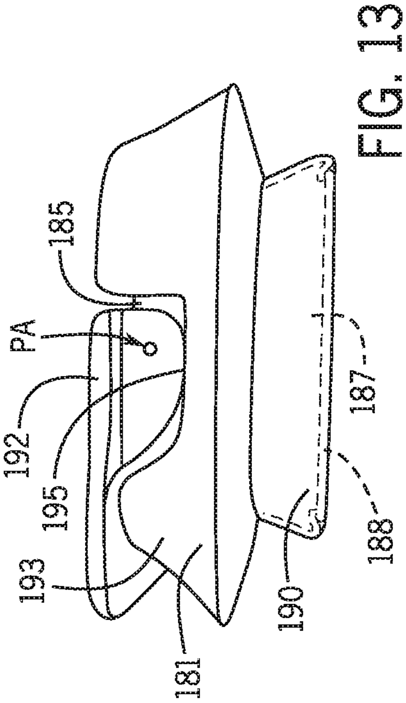
FIG. 13 is a side view of the lid shown in FIG. 12 in a locking position.
Figure 15:
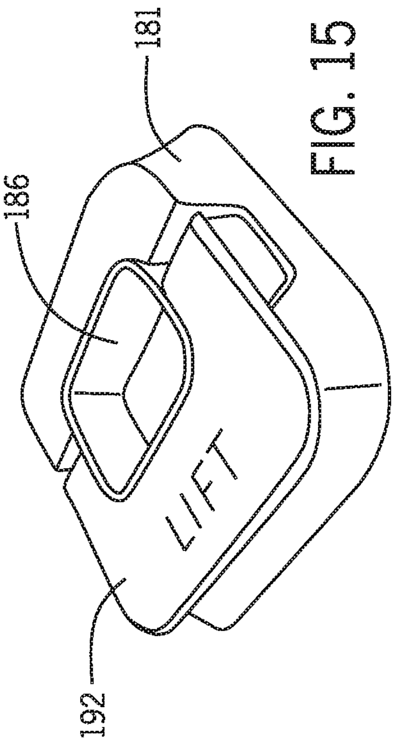
FIG. 15 is a perspective view of the lid shown in FIG. 13 in the locking position.
Figure 16:
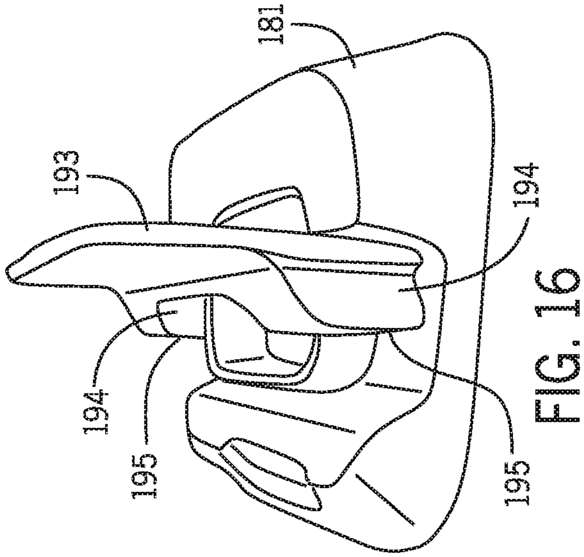
FIG. 16 is a side perspective view of the lid shown in FIG. 12 in the non-locking position.

The cam lever 192 (e.g., cam member) is rotatably coupled to the slider 185 about a pivot axis PA, so that the cam lever 192 can rotate relative to the slider 185 between a non-locking position (FIGS. 12, 14, and 16) and a locking position (FIGS. 13 and 15). The illustrated cam lever 192 includes a lever 193, which has a generally a flat rectangular shape, and first and second legs 194, which are spaced apart and extend from the lever 193. Thus, the lever 193 and first and second legs 194 form a clevis shape that wraps around the upper portion 186 of the slider 185. Each leg 194 is rotatably coupled to the slider 185 (e.g., the upper portion 186) about the pivot axis PA and includes a cam surface 195, which is offset from the pivot axis PA (e.g., opposite from the lever 193.

Rotation of the cam lever 192 relative to the base 181 and the slider 185 from the non-locking position to the locking position moves the slider 185 (e.g., in an upward direction in FIGS. 12 and 16) relative to the base 181 through the cam surface 195 contacting the base 181, such that the lip 188 biases the resilient member 190 outwardly from a clearance fit into an interference fit with the wall 164 of the body 162 of the container 161 to secure the container lid 180 to the container 161 in the secured position. The term "clearance fit" means that the member (e.g., resilient member 190) is no larger than the size of the opening (e.g., in the body 162), so that the container lid 180 is removable from the container 161. For example, the resilient member 190 is sized to fit through the opening. The term "interference fit" means that the member (e.g., resilient member 190) is larger than the size of the opening (e.g., in the body 162), so that the container lid 180 is prevented from being removed from the container 161. For example, the resilient member 190 is sized to prevent being fitted through the opening. Thus, rotation of the cam lever 192 toward the locking position causes the pivot axis PA and coupled slider 185 to move (e.g., lift, rise, slide upward) relative to the base 181 through contact between the first cam surface 195 of the first leg 194 and a first part of the base 181 and between the second cam surface 195 and a second part of the base 181. In the locking position, the cam lever 192 nests with the upper portion of the slider 185 and nests within the recess 183 of the base 181. The illustrated cam lever 192 complements the base 181 by forming a substantially planar top between a top of the cam lever 192, a top of the upper portion 186 of the slider 185, and a top of the base 181, which is on an opposite side of the slider 185 from the cam lever 192.

The resilient member 190 can be configured to form a fluid (e.g., water, liquid) tight seal between the body 162 of the container 161 and the container lid 180 in the secured position. An outer profile of the lower portion 187 of the slider 185 can be shaped, either alone or in combination with the resilient member 190, to complement a profile of the open top in the body 162 of the container 161.

The container lid 180 advantageously provides a seal with the container 161 when secured thereto to retain the chemistry within the reservoir 165 of the container 161, and the container lid 180 can be removed and reattached quickly and easily (e.g., without fastening or screwing the lid). Also, by nesting the container lid 180 with the shroud 150, if provided, the lid 180 can be removed without removing the shroud 150. Thus, the clean aesthetics can be maintained while replacing the chemistry in the reservoir 165.

The toilet 100 can include one or more indicators that identify (e.g., indicate) any useful information to a user of the toilet 100. The toilet 100 can be configured to connect to a remote electronic device, such as a smart phone, a tablet, etc., through a wireless method (e.g., Bluetooth), and an indicator may indicate connectivity information regarding the status of the cleaning system, such as whether the cleaning compound is low in level and/or in concentration, and/or information regarding timing of the last and/or next cleaning cycle. Any number of indicators can be located, for example, on the shroud 150, the lid 122, or on other components of the toilet 100.

It is noted that the toilet 100 having the chemical dispensing system 160 integrated with the shroud 150 can be employed on other types of toilets, included inside of shroudless tanks. The system 160 can still be operatively coupled to the sidewall 120*a* of the tank 120, as well as having the configuration otherwise described above. However, the container 161 of the system 160 would be visible with or with the container lid coupled thereto with shroudless tanks.

It is further noted that the container 161 can hold a solid chemical compound (e.g., pellets, tablets, discs, pucks, etc.) while allowing water to pass through to mix with the solid chemical compound as it dissolves. For example, water enters the reservoir of the container 161 through the openings 274 in the diffusing tube 273 and dissolves the solid chemical compound to form cleaning compound.

It is noted that the toilet 100 can be configured to connect to a remote electronic device, such as a smart phone, a tablet, a computer, a remote control, or any other suitable device. The toilet 100 and the remote electronic device can connect through a wireless method, such as Bluetooth or any other wireless method, to control operation of the toilet 100 from the remote device. For example, the device can receive data regarding the chemical dispensing system 160 in the toilet 100, which can include, but is not limited to data involving level and/or concentration of chemistry remaining in the container, frequency of cleaning cycles, estimated time until the chemical compound is completely used up, recommended date for next cleaning cycle, estimated remaining life (e.g., days, power, etc.) of any batteries in the system, whether any components of the system are not functioning properly, as well as any other useful information. By way of example, an application or app (e.g., phone app) can be used to receive this data from the toilet 100 and send push notifications to the user regarding any of the data, such as alerts. Additionally, the remote electronic device can be configured to control operation of the toilet remotely, such as to activate a cleaning cycle from a remote location.

The toilets described in this application can be configured to utilize chemistry to advantageously help clean (e.g., up to a level just below disinfection) or help maintain the cleanliness longer than toilets not having the improved chemistry. As non-limiting examples, the chemistries disclosed herein may advantageously help prevent the formation of scale, remove scale that has formed, prevent or remove biofilm, prevent or mask odors, and/or sanitize components of toilets or other devices disclosed in this application. The toilets utilizing the improved chemistry may be able to go for one to six months (e.g., eight weeks) or longer without having to be cleaned (e.g., before the build-up of deposits). More specific examples of chemistry/cleaning compounds are described below in greater detail.

The chemistry/cleaning compounds can be delivered to specific components of the toilets (e.g., bowl, seat, tank, and/or trap, etc.) alone or mixed with another compound or element. The compounds may be provided into the toilets, such as prepared external to the toilet and introduced into the toilet for use therein. The compounds may be generated in the toilets, such as generated within systems and/or subsystems of the toilets for use therein. For example, chemical/compound generators may be employed by a toilet and/or an accessory to produce a cleaning compound used to clean the toilet and/or accessory.

The systems/toilets can introduce one or more than one cleaning compound into or onto a component (e.g., element), surface, and/or feature of the system/toilet. As discussed above, one or more cleaning compounds can be introduced into or onto the bowl, such as from a reservoir in the tank, and/or any other part of the toilet. As one such example, a toilet may be configured to introduce hydrogen peroxide ($H_2O_2$) into the bowl of the toilet to help clean the internal surfaces that come into contact with liquid and solid waste. In addition to $H_2O_2$, chlorines and peracedic acid (PAA) are additional non-limiting examples of chemicals/compounds that may be used with the toilets and methods of this application. Some additional non-limiting examples of chemicals/compounds that may be used with the systems and methods of this application include (but are not limited to) polyphosphates (e.g., sodium hexametaphosphate (SHMP), tetrapotassium pyrophosphate (TKPP), etc.), low pH acids (e.g., hydrogen chloride (HCL), dihydrogen phosphate ($H_2PO_4$), trisodium phosphate (TSP), ethylenediaminctetraacidic acid (EDTA), and compounds thereof, as well as other acids and/or sequestering agents. These chemicals/compounds may be most beneficial in, for example, preventing and/or removing scale. Yet other examples of chemicals/compounds that may be used with the systems of this application include (but are not limited to) didecyldimethyl ammonium chloride (DDAC), $H_2O_2$, sodium hypochlorite (NaOCl) such as bleach, PAA, triclosan, formic acid, TSP, and compounds thereof, as well as other disinfectants (e.g., quaternary disinfectants) and biocides. These chemicals/compounds may be most beneficial in, for example, preventing and/or removing biofilm. It is noted that other chemicals/compounds may be used in the systems and methods disclosed in this application, and any such chemical/compound disclosed may be used with any system and/or method disclosed.

The chemicals/compounds can take various forms, such as liquids or solids. One example is in the form of tablets or discs. Another example is in the form of phosphate beads, which may be spherical (e.g., 12.7-25.4 mm in diameter) or may have any suitable shape. Another example includes a shell (e.g., glass shell) that houses a chemical (e.g., phosphate) inside and is released or brought into contact with a diluent, such as through an opening. The concentration of the chemical may be relatively high, so that it can last over a long period of time (e.g., about one year) without having to be replaced.

The toilets may include a system that generates a chemical/compound, such as one of those disclosed above. For example, a generator that produces $H_2O_2$, such as from oxygen (e.g., in air) and water from a water source can be employed. Thus, a chemical/compound generator can be located within the toilet (e.g., the container) to produce the cleaning compound. For example, a generator may be configured to produce a chemical (e.g., $H_2O_2$) that is diluted to 30 ppm (parts per million), such as with water or other suitable diluent. According to one example, a generator is configured to produce a chemical that is diluted to 100 ppm.

The systems for introducing a cleaning compound can be built into the toilet (e.g., an OEM produced toilet) or may be an "add-on" system that can be installed onto a traditional system and/or toilet (after its manufacture, such as an "after-market" system or assembly) to improve the cleanliness of the traditional system and/or toilet.

The systems and methods described in this application may include an electrochemical generator or method of electrochemical generation, which may involve using oxygen, water, and an electrical current to generate a chemical/compound.

As utilized herein, the terms "approximately," "about." "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom." "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the cleaning systems, dispensing systems, toilets, standalone systems, etc. as shown in the numerous exemplary embodiments of this application are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., dispenser, generator, container, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

We claim:

1. A chemical dispensing system for a toilet, the chemical dispensing system comprising:
- a container configured to contain a chemical compound;
- an inlet line that fluidly connects a fill valve of the toilet and an inlet of the container;
- a valve assembly configured to control a flow of water into the container from the inlet line and the fill valve, wherein the chemical compound mixes with water in the container to form a cleaning compound;
- an outlet line that fluidly connects the container to a flush valve of the toilet to provide the cleaning compound to the toilet; and
- a shroud configured to receive the container and at least partially conceal the fill valve and the flush valve.

2. The chemical dispensing system of claim 1, further comprising:
- a reservoir defined by the container by a plurality of walls and a bottom, wherein the reservoir comprises an open top.

3. The chemical dispensing system of claim 1, wherein the valve assembly includes a plurality of settings associated with the flow of water into the container.

4. The chemical dispensing system of claim 3, wherein the plurality of settings includes a first setting for a first concentration of the cleaning compound and a second setting for a second concentration of the cleaning compound.

5. The chemical dispensing system of claim 3, further comprising:
- a multi-position control coupled to the valve assembly and configured to select one of the plurality of settings.

6. The chemical dispensing system of claim 5, wherein the multi-position control includes a knob.

7. The chemical dispensing system of claim 5, further comprising:
- at least one indicator configured to inform a user of the selected one of the plurality of settings.

8. The chemical dispensing system of claim 7, wherein the at least one indicator indicates a concentration of the cleaning compound.

9. The chemical dispensing system of claim 1, further comprising:
- a diffusing tube having at least one opening configured to diffuse the flow of water into the container to mix with the chemical compound.

10. The chemical dispensing system of claim 1, wherein the chemical compound includes at least one pellet, at least one tablet, at least one disc, or at least one puck.

11. A chemical dispensing system comprising:
- a container configured to contain a chemical compound;
- an inlet line that fluidly connects a fill valve for and an inlet of the container;
- a valve assembly configured to control a flow of water into the container from the inlet line and the fill valve, wherein the chemical compound mixes with water in the container to form a cleaning compound;
- an outlet line that fluidly connects the container to a flush valve to provide the cleaning compound in a flush cycle to a toilet;

and
- a shroud configured to receive the container and at least partially conceal the fill valve or the flush valve.

12. A toilet comprising:
- a fill valve configured to selectively fill a tank;
- a flush valve configured at least partially empty the tank in a flush cycle; and
- a chemical dispensing system comprising:
  - a container configured to contain a chemical compound that removes scale including one or more mineral deposits;
  - an inlet line that fluidly connects the fill valve of the toilet and an inlet of the container;
  - a valve assembly configured to control a flow of water into the container from the inlet line and the fill valve, wherein the chemical compound mixes with water in the container to form a cleaning compound;
  - an outlet line that fluidly connects the container to the flush valve of the toilet to provide the cleaning compound to the toilet to remove scale including one or more mineral deposits; and
  - a shroud configured to receive the container and at least partially conceal the fill valve or the flush valve.

13. The toilet of claim 12, further comprising:
- a flush handle coupled to the flush valve.

14. The toilet of claim 12, wherein the valve assembly includes a plurality of settings associated with the flow of water into the container.

15. The toilet of claim 14, wherein the plurality of settings includes a first setting having a first concentration of the cleaning compound and a second setting having a second concentration of the cleaning compound.

16. The toilet of claim 12, wherein the chemical dispensing system further comprises:

a multi-position control coupled to the valve assembly and configured to select one of the plurality of settings.

17. The toilet of claim 12, wherein the chemical dispensing system further comprises:

at least one indicator configured to inform a user of the selected one of the plurality of settings.

18. The toilet of claim 17, wherein the at least one indicator indicates a concentration of the cleaning compound.

19. The toilet of claim 12, wherein the chemical dispensing system further comprises:

a diffusing tube having at least one opening configured to diffuse the flow of water into the container to mix with the chemical compound.

* * * * *